(12) United States Patent
Kube et al.

(10) Patent No.: US 7,106,973 B2
(45) Date of Patent: Sep. 12, 2006

(54) APPARATUS AND METHOD FOR USE IN FREE-SPACE OPTICAL COMMUNICATION COMPRISING OPTICALLY ALIGNED COMPONENTS INTEGRATED ON CIRCUIT BOARDS

(75) Inventors: Erhard Kube, Dresden (DE); Cathal Oscolai, Encinitas, CA (US); Frank Ebermann, Dresden (DE)

(73) Assignee: LightPointe Communications, Inc., San Diego, CA (US)

( * ) Notice: Subject to any disclaimer, the term of this patent is extended or adjusted under 35 U.S.C. 154(b) by 0 days.

(21) Appl. No.: 10/218,684

(22) Filed: Aug. 13, 2002

(65) Prior Publication Data
US 2004/0033078 A1 Feb. 19, 2004

(51) Int. Cl.
*H04B 10/00* (2006.01)
(52) U.S. Cl. .................. 398/164; 398/118; 398/130; 398/140; 398/153
(58) Field of Classification Search .............. 398/9, 398/16, 22–24, 118, 128, 129, 130, 131, 135, 398/156, 164, 153, 140
See application file for complete search history.

(56) References Cited

U.S. PATENT DOCUMENTS

| | | | |
|---|---|---|---|
| 4,428,647 A | 1/1984 | Sprague et al. | |
| 4,469,443 A | 9/1984 | Geller | |
| 4,639,586 A | 1/1987 | Fender et al. | |
| 4,689,482 A | 8/1987 | Horikawa et al. | |
| 4,709,413 A | 11/1987 | Forrest et al. | |
| 4,761,059 A | 8/1988 | Yeh et al. | |
| 4,794,345 A | 12/1988 | Linford et al. | |
| 4,823,357 A | 4/1989 | Casey | |
| 4,826,269 A | 5/1989 | Streifer et al. | |
| 4,922,502 A | 5/1990 | Unternahrer et al. | |
| 5,142,400 A | 8/1992 | Solinsky | |
| 5,227,906 A * | 7/1993 | Tokumitsu ................... 398/55 |
| 5,264,955 A | 11/1993 | Sakanaka et al. | |
| 5,267,010 A | 11/1993 | Kremer et al. | |
| 5,268,978 A | 12/1993 | Po et al. | |
| 5,280,184 A * | 1/1994 | Jokerst et al. ................ 257/82 |

(Continued)

FOREIGN PATENT DOCUMENTS

WO    WO 01/05069 A2 * 1/2001

OTHER PUBLICATIONS

Kim et al.; "Scintillation Reduction Using Multiple Transmitters"; *Society of Photo-Optical Instrumentation Engineers*, vol. 2990; pp. 102-113 (1997).

(Continued)

*Primary Examiner*—M. R. Sedighian
(74) *Attorney, Agent, or Firm*—Fitch, Even, Tabin & Flannery

(57) ABSTRACT

The present invention provides an apparatus and method for free-space optical communication. The apparatus includes a first board with a plurality of optoelectronic converter components mounted on the first board. The apparatus additionally includes at least one optics element optically aligned with at least one of the optoelectronic converter components, where the optics element is configured to pass light directly between free-space and the plurality of optoelectronic converter components, and electronics coupled to at least one of the plurality of optoelectronic converter component. In one embodiment, communication is achieved by providing electric signals to a plurality of lasers that are mounted on a first board, generating a plurality of optical signals with the plurality of lasers and directing the plurality of optical signals into free-space with a plurality of optics elements.

19 Claims, 11 Drawing Sheets

U.S. PATENT DOCUMENTS

| | | | |
|---|---|---|---|
| 5,311,535 A | | 5/1994 | Karpinski |
| 5,327,274 A | * | 7/1994 | Yamaguchi ................ 359/107 |
| 5,394,489 A | | 2/1995 | Koch |
| 5,416,861 A | * | 5/1995 | Koh et al. .................... 385/14 |
| 5,465,170 A | | 11/1995 | Arimoto |
| 5,501,385 A | | 3/1996 | Halpin |
| 5,513,021 A | * | 4/1996 | Kaneshiro et al. ............ 359/15 |
| 5,521,736 A | | 5/1996 | Swirhun et al. |
| 5,548,772 A | * | 8/1996 | Lin et al. ................... 398/164 |
| 5,661,584 A | * | 8/1997 | Redmond et al. ............. 398/45 |
| 5,710,652 A | | 1/1998 | Bloom et al. |
| 5,715,339 A | | 2/1998 | Takai et al. |
| 5,764,677 A | | 6/1998 | Scheps |
| 5,777,768 A | | 7/1998 | Korevaar |
| 5,818,984 A | * | 10/1998 | Ahmad et al. ................ 385/14 |
| 5,857,042 A | * | 1/1999 | Robertson et al. ............ 385/33 |
| 5,943,456 A | | 8/1999 | Buchholz et al. |
| 6,005,700 A | | 12/1999 | Pressler et al. |
| 6,203,211 B1 | | 3/2001 | Cheng |
| 6,239,888 B1 | | 5/2001 | Willebrand |
| 6,272,271 B1 | * | 8/2001 | Wojnarowski et al. ........ 385/52 |
| 6,323,980 B1 | * | 11/2001 | Bloom ....................... 398/129 |
| 6,327,291 B1 | | 12/2001 | Marshall |
| 6,398,425 B1 | * | 6/2002 | Williams et al. .............. 385/89 |
| 6,429,981 B1 | * | 8/2002 | Ishii et al. ................... 359/813 |
| 6,452,700 B1 | * | 9/2002 | Mays, Jr. ..................... 359/15 |
| 6,462,847 B1 | | 10/2002 | Willebrand |
| 6,493,121 B1 | * | 12/2002 | Althaus ...................... 398/135 |
| 6,509,992 B1 | * | 1/2003 | Goodwill .................... 398/131 |
| 6,583,904 B1 | * | 6/2003 | Mahlab et al. .............. 398/129 |
| 6,587,618 B1 | | 7/2003 | Raguin et al. |
| 6,657,783 B1 | | 12/2003 | Presby et al. |
| 6,968,133 B1 | | 11/2005 | Sakanaka |
| 2002/0094187 A1 | | 7/2002 | Barrett |
| 2002/0126340 A1 | | 9/2002 | Nikiforov et al. |
| 2004/0120717 A1 | | 6/2004 | Clark et al. |

OTHER PUBLICATIONS

J. Schuster et al.; "Optomechanical Design of STRV-2 Lasercom Transceiver Using Novel Azimuth-Slant Gimbal"; *Society of Photo-Optical Instrumentation Engineers*, vol. 2699; pp. 227-239 (Jan. 30-31, 1996).

E. Korevaar et al.; "Design of Satellite Terminal for BMDO Lasercom Technology Demonstration"; *Society of Photo-Optical Instrumentation Engineers*, vol. 2381; pp. 60-71 (Feb. 7-8, 1995).

W. M. Bruno et al.; "Diode Laser Spatial Diversity Transmitter"; *Society of Photo-Optical Instrumentation Engineers*, vol. 1044; pp. 187-194 (1989).

E. Korevaar et al., "Status of SDIO-IS&T Lasercom Testbed Program", Society of Photo-Optical Instrumentation Engineers, vol. 1866, pp. 116-127 (Jan. 20-21, 1993).

Patent Cooperation Treaty, "PCT International Preliminary Examination Report", dated Oct. 13, 2004, for corresponding PCT Application No. PCT/US03/18969, 14 pages.

Patent Cooperation Treaty, "PCT Written Opinion", dated May 7, 2004, for corresponding PCT Application No. PCT/US03/18969, 7 pages.

Patent Cooperation Treaty, "PCT International Search Report", dated Dec. 15, 2003, for corresponding PCT Application No. PCT/US03/18969, 3 pages.

* cited by examiner

APPARATUS AND METHOD FOR USE IN FREE-SPACE OPTICAL COMMUNICATION COMPRISING OPTICALLY ALIGNED COMPONENTS INTEGRATED ON CIRCUIT BOARDS

BACKGROUND OF THE INVENTION

1. Field of the Invention

The present invention relates generally to optical communication, and more specifically to free-space optical communication utilizing devices formed utilizing compact transceivers.

2. Discussion of the Related Art

For digital data communications, optical media offers many advantages compared to wired and RF media. Large amounts of information can be encoded into optical signals, and the optical signals are not subject to many of the interference and noise problems that adversely influence wired electrical communications and RF broadcasts. Furthermore, optical techniques are theoretically capable of encoding up to three orders of magnitude more information than can be practically encoded onto wired electrical or broadcast RF communications, thus offering the advantage of carrying much more information.

Fiber optics are the most prevalent type of conductors used to carry optical signals. An enormous amount of information can be transmitted over fiber optic conductors. A major disadvantage of fiber optic conductors, however, is that they must be physically installed.

Free-space atmospheric links have also been employed to communicate information optically. A free-space link extends in a line of sight path between the optical transmitter and the optical receiver. Free-space optical links have the advantage of not requiring a physical installation of conductors. Free-space optical links also offer the advantage of higher selectivity in eliminating sources of interference, because the optical links can be focused directly between the optical transmitters and receivers, better than RF communications, which are broadcast with far less directionality. Therefore, any adverse influences not present in this direct, line-of-sight path or link will not interfere with optical signals communicated.

Despite their advantages, free-space optical transceivers have heretofore comprised bulky devices having many separate components that tend to be expensive to manufacture, in part due to alignment issues.

It is with respect to these and other background information factors relevant to the field of optical communications that the present invention has evolved.

SUMMARY OF THE INVENTION

The present invention advantageously addresses the needs above as well as other needs by providing an apparatus for communicating optical signals over a free-space link. The apparatus includes a first board, a plurality of optoelectronic converter components mounted on the first board, at least one optics element optically aligned with at least one of the plurality of optoelectronic converter components and configured to pass light directly between free-space and the at least one optoelectronic converter component, and electronics coupled to the at least one optoelectronic converter component. In one embodiment, the electronics are mounted on the first board. In another embodiment, apparatus further includes a second board having the electronics mounted thereon, wherein the second board is positioned to a side of the first board opposite the at least one optics element. In one embodiment, the plurality of optoelectronic converter components are configured in an array.

The present invention further provides a method of optical communication that includes the steps of providing electric signals to a plurality of lasers that are mounted on a first board, generating a plurality of optical signals with the plurality of lasers in response to the electric signals, and directing the optical signals into free-space with at least one optics element optically aligned with at least one of the plurality of lasers and configured to pass light directly from the at least one lasers into free-space. In on embodiment, the step of providing electric signals includes providing electric signals to the plurality of lasers with electrical components that are mounted on the first board and electrically coupled to the plurality of lasers.

The present invention provides for a method of optically communicating, including the steps of receiving an optical signal from free-space with a plurality of optics elements; directing the optical signal onto a plurality of detectors that are mounted on a first board and that are optically aligned with at least one of the plurality of optics element so that the light can be passed directly from free-space to the plurality of detectors; and detecting the optical signal with the plurality of detectors to generate corresponding electrical signals. The method can additionallyin clued the step of receiving the electric signals from the plurality of detectors with electrical components that are mounted on the first board and electrically coupled to the plurality of detectors.

A method of making an apparatus for optical communication is further provided. The method includes forming a substantially planar structure having a plurality of optics elements; establishing a first board; identifying locations on the first board for a plurality of optoelectronic converter components so that each optoelectronic converter component is aligned with a respective one of the optics elements; and mounting the optoelectronic converter components in the identified locations.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

The following description is not to be taken in a limiting sense, but is made merely for the purpose of describing the general principles of the invention. The scope of the invention should be determined with reference to the claims.

Figure 1:
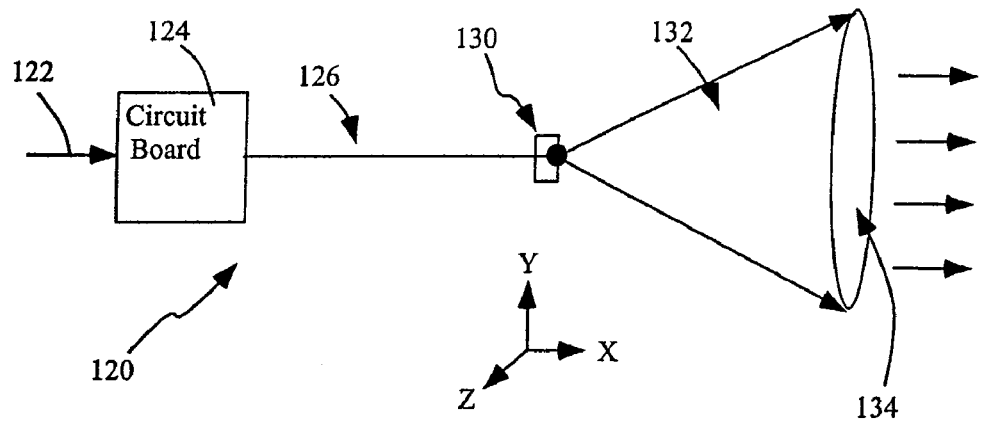
FIG. 1 depicts a block diagram of a previously constructed device for optical communication.

FIG. 1 depicts a block diagram of a known device 120 for optical communication. The device includes a circuit board 124 receiving signals 122.

The circuit board generates an electrical drive signal based on the received signal 122 which is used to drive a laser diode 130 or other optical device for generating optical signals. The circuit board couples with a cable or conductor 126, typically a flexible cable. The cable couples with the laser diode 130 to carry the electrical drive signal to the laser diode to drive the diode. The laser diode generates an optical signal 132 that is directed towards a lens 134.

As is typical with laser diodes, the laser diode 130 is encased in packaging and/or a housing. This requires the step of assembling the diode into the housing, which requires time and adds cost. Further, the housing must include a means for coupling the cable 126 with the diode to receive the electrical drive signal. In some embodiments, the housing must additionally include coupling to an optical conductor or fiber for communicating the optical signal from the laser diode. The housing typically includes a metal and/or plastic casing that seals the laser diode. The housing usually includes a transparent portion or window to allow the optical signal to be transmitted. The housing further gives the device bulk to allow for easier handling. Optical detectors have similar housings to encase the optical detector.

In this configuration, the laser diode 130 must be aligned with the lens 134 to maximize the amount of light impinging on the lens and to avoid interference with other optical signals that might be present. This alignment requires the laser diode 130 be mounted and aligned along all three axes X, Y and Z. Thus, in constructing the device 120, a technician must mount the laser diode and must painstakingly align the diode with the lens or lenses, or the lens(es) with the diode in all three axes. This adds considerable amounts of time to the construction of the device 120 as well as considerable cost. The cost arises in both the use of encased diodes as well as time to construct, including man hours in alignment.

The same or a similar configuration as shown in FIG. 1 can also be employed for receive signals, where the laser diode is replace by a optical detector. Similarly, the detector must also be encased in packaging with coupling to the cable 126 and must be mounted. Once mounted, the detector must additionally be aligned along all three axes X, Y and Z to maximize the light received by the detector from the lens 132. Further, the lens must also be aligned along all three axes.

Figure 2:
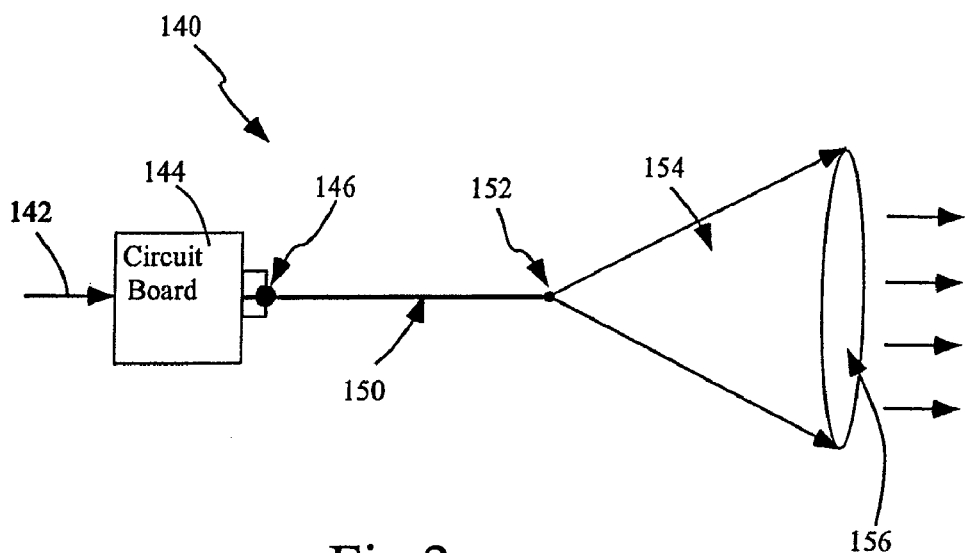
FIG. 2 depicts a simplified block diagram of an apparatus for optical communication.

FIG. 2 depicts a simplified block diagram of an apparatus 140 for optical communication. A laser diode 146 (and/or detector) packaged within a housing is coupled to the circuit board 144 receiving an input signal 142. The optical signal generated by the laser diode 146 is directly feed into an optical conductor 150, such as a fiber optic cable. The optical conductor 150 has a terminal end 152 that emits the optical signal 154 to impinge on the optics 156, such as one or more lenses. The laser diode 146 is typically mounted to the circuit board 144 through housing and mating socket mount or soldering.

Embodiments of the present invention provide a compact, integrated transceiver for optical communication, and more particularly free-space optical communication. In one embodiment, the apparatus provides an integrated multi-beam module for free-space optical communication. Similarly, the apparatus provides for a compact, integrated optical communication receiver. The apparatus can additionally include one or more receivers integrated with one or more transmitters to provide an optical communication transceiver. The integrated transmitters, receivers and/or transceivers can be incorporated into substantially any optical communication system, and in particular, substantially any free-space optical communication system and/or network.

The present apparatus or module combines three portions into a single module to facilitate higher performance and greater efficiency than previous free-space optical communication systems. Typically, the module includes electronic circuitry, a plurality of optical components such as optoelectronic converter components, and optics and/or optics elements for the conditioning, focusing and/or forming of communication beams. For example, the electronic circuitry can be an electronic printed circuit board that includes circuitry for distributing electrical signals and the control of optoelectronic converter components. The design and manufacturing of the electronic circuitry can include surface-mount devices, "chip-on-board" configurations (e.g., where optoelectronic converter components can be formed and/or attached directly on the circuit board), flip-chip bonding, and other similar design and manufacturing techniques.

The optoelectronic converter components can be substantially any component providing conversion from an electronic signal to an optical signal and/or from an optical to an electronic signal including, but not limited to, laser diodes, diode detectors, vertical cavity surface emitting lasers (VCSEL) and the like. In some embodiments, the electronic circuitry and optoelectronic converter components are combined into a single functional layer. For example, the electronics can be formed through a multi-layer circuit board and the optoelectronic converter components can be formed or fixed directly on one or more of the layers of the circuit board.

As introduced above, the optics elements of the present invention provide for the conditioning, formation and/or focusing of optical signals. In one embodiment, the optics elements are positioned, fixed, secured and/or formed within a carrier plate. The carrier plate can be configured to secure a plurality of optics elements within a single structure to allow mounting of the plurality of optics elements relative to the optoelectronic converter components. For example, the carrier plate can include a frame (constructed of metal, plastic and other similar materials or combination of materials capable of providing structure and support) that secures and maintains a plurality of optics elements in a fixed position within the carrier plate. The carrier plate can then be mounted or secured with a circuit board such that the plurality of optics elements optically aligned with one or more optoelectronic converter components. The carrier plate can also be formed from a single continuous piece with a plurality of optics elements formed within the plate.

The optics elements can be substantially any optical element known for forming, focusing and/or conditioning of optical signals including, but not limited to, discrete lenses, Fresnel lenses, diffusion lenses, mirrors, telescopes, polarization elements and substantially any other or combination of other optics elements known. These optics elements condition the optical signal according to desired effects. For example, in transmitting optical signals, the optics elements can condition a beam emitted from a laser diode to a desired divergence, or in receiving optical signals, the optics elements can focus the received optical beam to impinge on a detector device.

Figure 3:
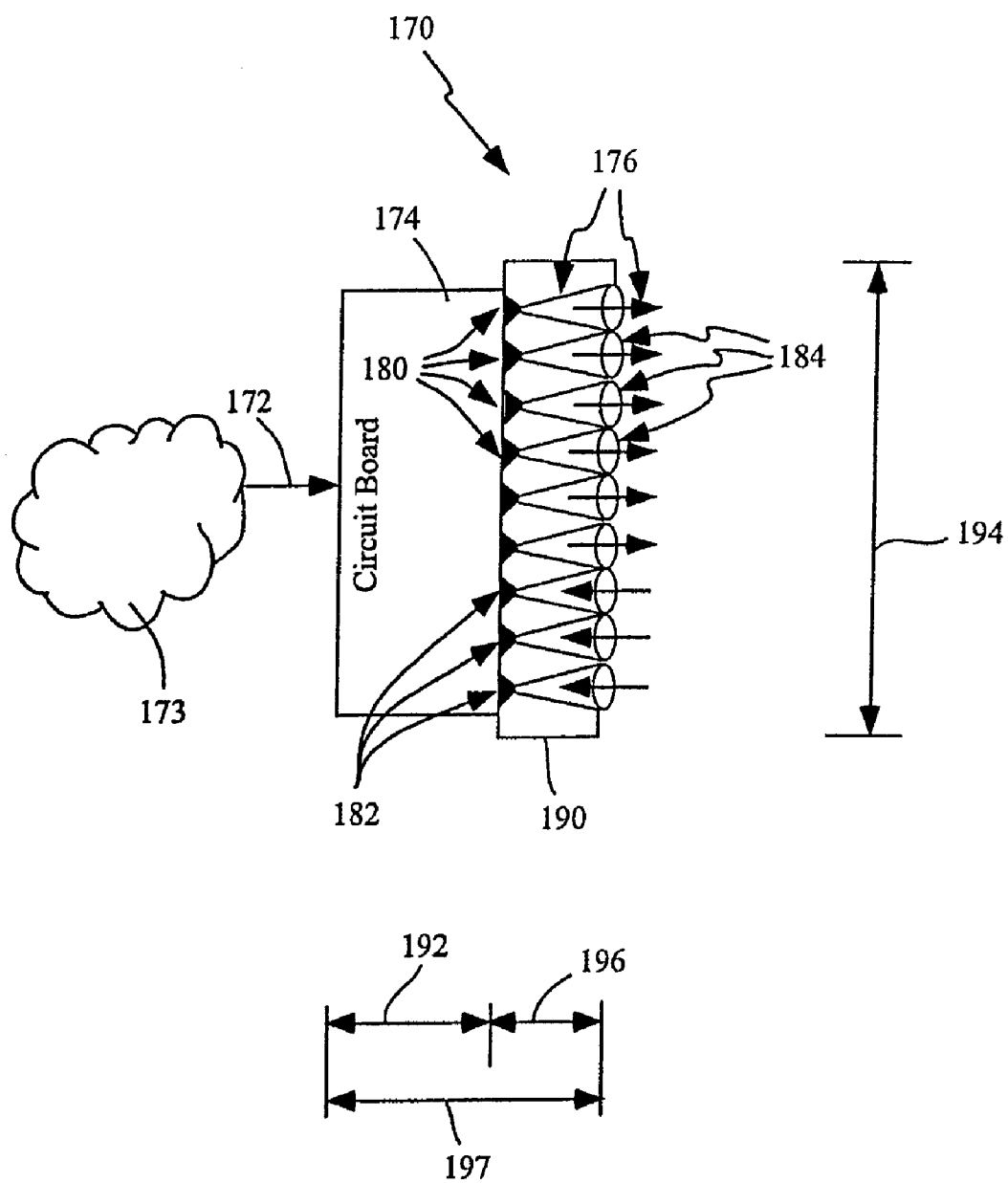
FIG. 3 depicts a cross-sectional view of a simplified block diagram of an apparatus for transmitting and/or receiving optical signals according to one embodiment of the present invention.

FIG. 3 depicts a cross-sectional view of a simplified block diagram of an apparatus 170 for transmitting and/or receiving optical signals 176 according to one embodiment of the present invention. In the embodiment shown, a plurality of optoelectronic converter components or optical components 180, 182, such as laser diodes, detectors, other optoelectronic converter components and optical components, are directly attached or coupled with or formed within the circuit board 174. The optical components 180 typically are not encased in a housing and/or packaging. This allows each optical component to be directly integrated with the circuit board 174. In some embodiments, the optoelectronic converter component additionally includes a substrate (e.g., a ceramic substrate) bonded with the semiconductor optoelectronic converter component before being mounted directly onto the circuit board 174. The circuit board can directly generate and receive signals from the optical components. Any number of optical components can be mounted with the circuit board, for example an array of four components formed in a column, two arrays of six components each in rows, and an array of 64 components formed in an 8×8 matrix, are just a few examples of possible configurations.

The circuit board 174 can additionally be coupled with other components, circuits and/or networks 173, such as a local area network, a PSTN and/or the Internet. Data and/or information 172 can be communicated to and from the circuit board through the network 173 directly, or through one or more intermediate components or circuit boards. Data received from the network can be optically communicated from an optical component 180 over free-space. Optical data detected by an optical component 180 can additionally be forwarded to the network. The communication between the circuit board 174 and the network can be through substantially any communication technique including electrical, optical, wireless and substantially any other technique.

Mounting the optical components 180 without packaging and/or housing significantly reduces the cost of the optical components as well as reduces the size of the optical components. Further, directly mounting the optical components without packaging allows a larger number of optical components to be attached in the same amount of circuit board real estate. Additionally, eliminating the packaging allows the apparatus 140 to be constructed in a smaller size than previous systems and at a reduced weight. Not only can the apparatus be constructed with a reduced depth 192 due to the direct mounting and the elimination of packaging, but both the lengths and widths (e.g., 194) of circuits can be reduced because the optical components require less circuit board real estate. Size and weight can be significant factors in free-space optical communication where transmitters, receiver and/or transceivers are mounted onto buildings or other structures. Reduced size and weight allows for easier mounting on less structure or building real estate with reduced load on the structure or building.

In assembly of the apparatus 170, the optical components 180, 182 can be directly attached or coupled to the circuit board 144 through substantially any method including soldering, bonding, adhesive, socket mounts and substantially any other method for attaching. Typically, the optical components are formed or placed automatically on the circuit board. In some embodiments, the optical components are positioned within predefined tolerances, such as within hundreds of micrometers ($\mu$m), preferably within tens of $\mu$m, most preferably within less than 10 $\mu$m. The positioning of the optical components can be achieved through any number of techniques including mechanical positioning, and mechanical positioning utilizing optical alignment. Because the optical components 180, 182 are precisely aligned on the circuit board 174, subsequent lateral adjustments of the optical components is typically not necessary.

One or more optics elements 184 are optically aligned and optically coupled with the optical components 180, 182. In the embodiment shown in FIG. 3, each optical component 180, 182 is optically aligned with a separate optics element 184. However, a plurality of optical components can be optically aligned with the same optics element, for example a single large optics element can be aligned with a plurality of laser diodes 182, as is fully describe below. The optics elements are configured to pass optical signals directly to and from the optical components. For example, the optical component can be a laser for generating an optical signal that directly impinges an optics element. The optics element conditions the optical signal and passes the optical signal into free-space. Alternatively, the optical component can be a optical signal detector (e.g., a photo diode) for detecting an optical signal that impinges on an optics element from free-space. The optics element passes and conditions (e.g., focuses) the free-space optical signal to directly impinge on the optical signal detector.

In one embodiment, the optics 184 are mounted or fixed within an optics mount 190. The optics mount secures the optics together in a single unit. This eliminates the adjustment of each optics element, and reduces the adjustments needed to optimize optical alignment and optical coupling between the optical components 180, 182 and the optics elements 184. In one embodiment, the optics elements are formed from a single continuous piece (e.g., formed by a molding or stamping process). For example, a single plate of plastic, glass or combination of plastic and glass can incorporate a plurality optics, such as a plurality of lenses, where each optics element aligns with one or more of the optical components 180, 182.

The optical mount 190 additionally allows the optics 184 to be mounted with the circuit board 174. The optical mount can be configured to precisely position the optics 184 at predefined distances 196 from the optical components 180 to maximize the conditioning of the optical signals 176 and the optical communication. The distance 196 is defined by the laws of optics, such as focal lengths and divergence.

Typically, the optics elements 184 are configured with short focal lengths, relative to previous free-space optics elements. As such, the distance 196 at which the optics elements are mounted can be relatively close to the circuit board 174 and optical components 180, 182. This results in a further reduction of the depth 197 of the optical communication apparatus 170.

Typically, the spacing of the plurality of optical components 180, 182 on the circuit board is such that divergence of optical signals generated by optical components does not cause interference with neighboring optical components. As one example, the optical components 180, 182 can be bonded directly onto the circuit board 174 with a separation between components of 30 mm. It will be apparent to one skilled in the art that the spacing of the optical components can be at substantially any distance without departing from the inventive aspects of the present invention.

Figure 4:
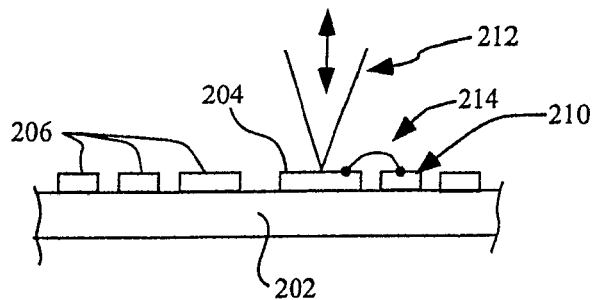
FIGS. 4 and 5 depict simplified block diagrams of a side elevated view of a circuit board with an optical component without a housing mounted directly onto the circuit board.
Figure 5:
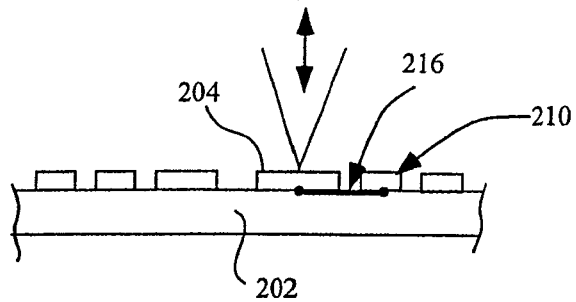

FIGS. 4 and 5 depict simplified block diagrams of a cross-sectional view of a circuit board 202 with an optoelectronic converter component or optical component 204, such as a laser diode or detector, without a housing mounted and/or fixed directly onto the circuit board. The circuit board includes additional components 206, as well as electronics 210, such as optical component controllers, drivers, receivers and the like. The electronics 210 couples with the optical component 204 to forward electrical signals to be converted to optical signals 212 through an optical transmitter (e.g., laser diode), or to receive electrical signals converted from optical signals 212 detected by an optical receiver (e.g., detector). The coupling between the optical component 204 and the electronics 210 can be through substantially any coupling including, but not limited to, a jumper coupling 214 or through a conductor 216 (as shown in FIG. 5) routed within the circuit board.

Figure 6:
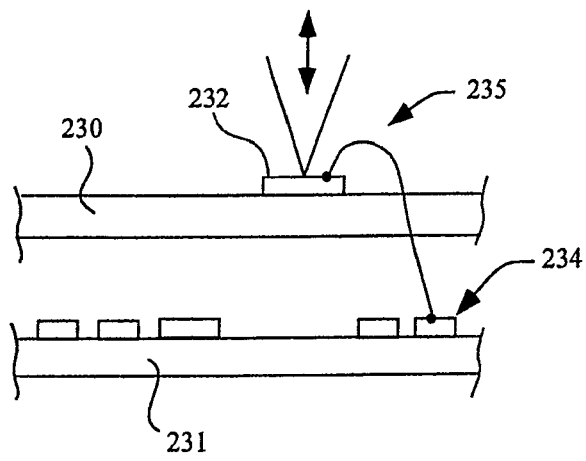
FIGS. 6 and 7 show simplified block diagrams of a side elevated view of a circuit board having two layers, or two circuit boards in cooperation.
Figure 7:
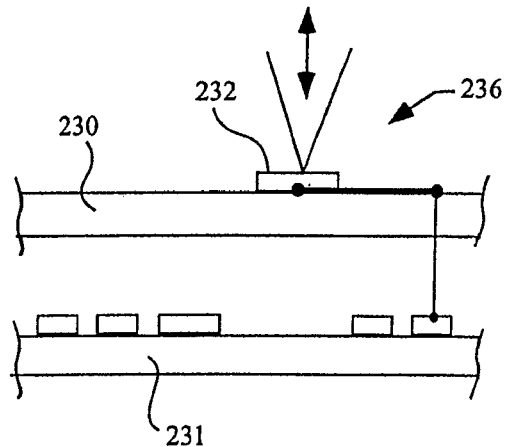

FIGS. 6 and 7 show simplified block diagrams of a cross-sectional view of a circuit board having two layers, or two circuit boards 230 and 231 in cooperation. An optoelectronic converter component or optical component 232 is attached on the first circuit board 230. An electronic device or electronics 234, such as laser driver, signal detector, optical component controller and the like, is attached on the second circuit board 230. The electronics 234 couples with the optical component through substantially any means including, but not limited to, a jumper conductor 235, a conductor 236 routed within the circuit boards (as shown in FIG. 7), a through whole via or other such coupling.

Figure 8:
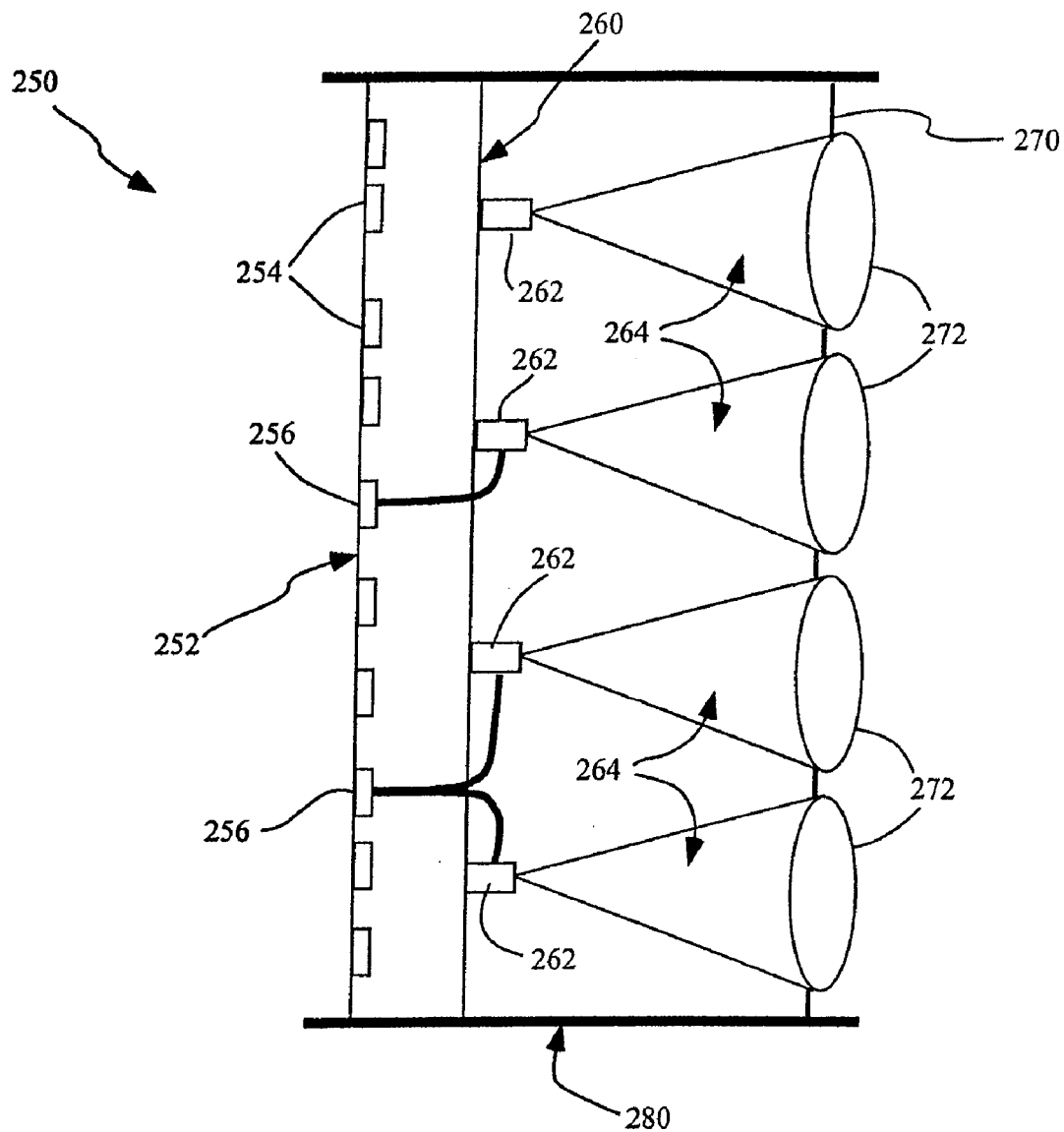
FIG. 8 depicts a simplified block diagram of a cross-section view of an optical communication apparatus according to one embodiment of the present invention.

In one embodiment, the optical communication apparatus can be constructed with three layers. FIG. 8 depicts a simplified block diagram of a cross-section view of an optical communication apparatus 250 according to one embodiment of the present invention. A first layer 252 includes circuit components and/or electronics, including substantially any electronic device 254 and 256, such as microchips, capacitors, resistors, power converters, laser drivers and the like.

The second layer 260 includes the optoelectronic converter components 262 for generating or detecting optical signals 264. The first and second layers can be formed as a single circuit board, as described above. Alternatively, the first and second layers 252, 260 can be formed through separate circuit boards in cooperation. The second circuit board can be posited below or to the side of the first circuit board opposite optics elements 272. The electronics 256 couple with the optoelectronic converter components 262 for delivering electronic signals to the optoelectronic converter components to drive the generation of optical signals 264, or receiving electrical signals from the optoelectronic converter components generated based on received optical signals 264. In some embodiments, a single electronic device 256 can couple with a plurality of optoelectronic converter components 262.

The third layer 270 includes the optics elements 272. The optics are optically aligned and optically coupled with the optoelectronic converter components 262. Typically, the optics 272 are formed or mounted within a single structure 270. The optical alignment between the optoelectronic converter components 262 and optics elements 272 is greatly simplified because the positioning of the optoelectronic converter components relative to the optics elements is performed once for a plurality of optoelectronic converter components and optics elements. Previous systems required each laser and/or detector to be positioned along the X, Y and Z axes relative to an optics element. Alternatively, in the present invention the plurality of optoelectronic converter components 262 can all be adjusted once at the same time relative to the optics elements (or optics elements 272 can all be adjusted at once relative to the optoelectronic converter components).

The electronic devices 254, 256, the optoelectronic converter components 262 and the optics 272 can be assembled in a housing, frame or casing 280. The casing provides structure for the apparatus 250 and maintains positioning of the optics 272 relative to the optoelectronic converter components 262 and/or circuit board 252. The casing 280 additional protects the electronics 254, 256, optoelectronic converter components 262 and optics 272 from the environment in which the apparatus 250 is utilized. For example, the apparatus can be mounted in or on a building in an urban area and directed to aim at a second transmitter, receiver or transceiver to provide free-space optical communication.

Figure 9:
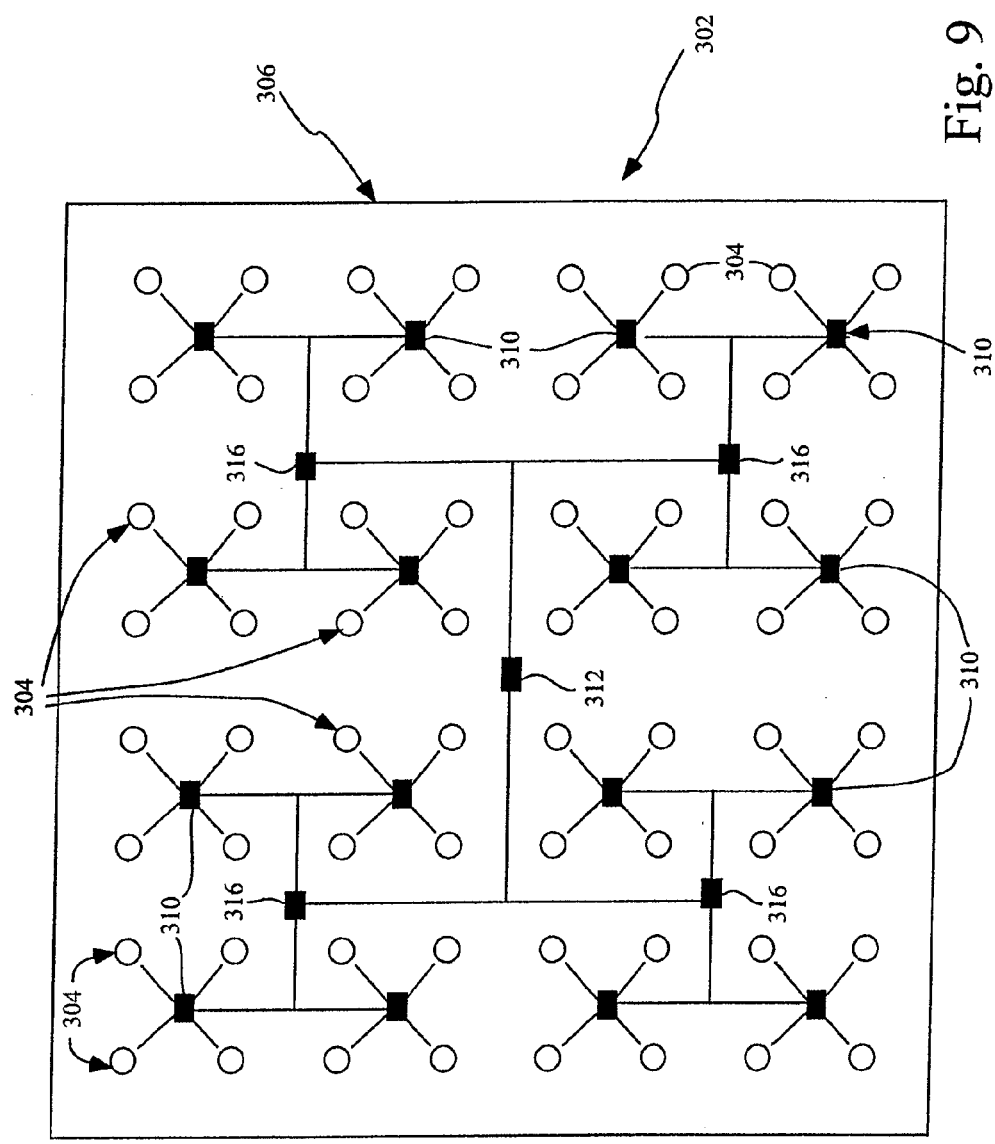
FIG. 9 depicts a simplified block diagram of an overhead view of an optical component array and/or matrix.

Attaching the optoelectronic converter components or optical components directly onto the circuit board without packaging allows a plurality of optical components to be incorporated into a relatively small area. Substantially any number of optical components can be incorporated on a circuit board providing substantially any configuration. FIG. 9 depicts a simplified block diagram of an overhead view of an optical component array and/or matrix 302. A plurality of optoelectronic converter or optical components 304 are distributed across a circuit board 306. In one embodiment, a plurality of electronics 310, such as optical drivers for driving laser diodes, are included on the circuit board 302. The plurality of electronics can transmit data signals to the laser diodes to drive or modulate the laser diode in the generation of optical signals. In one embodiment, the electronics 310 are summers coupled with a plurality of optical signal detectors such that the electronics receive data signals from the detectors and sum the signals. In one embodiment, each of the plurality of electronics controls a plurality of optical components. The plurality of optoelectronic converter components can be distributed on the circuit board such that the optoelectronic convert components alternate every other component between transmitting components and detector components, or some other distribution with both transmitting and detecting components.

In one embodiment, a central electronic device 312 activates and/or controls each of the plurality of electronics and/or electronic device 310, and/or controls a plurality of sub-central electronics 316 which in turn each control a plurality of electronics 310. In configuring the optical component matrix 302, each of a plurality of optical components 304 controlled by a single electronics 310 can be distributed at equal signal distances from the electronics device. Further, each of the electronics 310 can be distributed at equal distances or signal distances from the sub-central electronic devices 316 or the central electronic device 312, and each of the sub-electronic devices can be distributed at equal distances from the central electronic device 312. As such, coherence of the signals to and/or from the optical components 304 is maintained to synchronize the signals with respect to data transmission and reception, ensuring the signals to and from the central electronic device 312 are received by the central electronic device and reach each of the sub-electronic device 316 (or electronics 310 if directly coupled with the central electronic device) at substantially the same time. Still further, control signals to and from the sub-central electronics are received by the sub-central electronic an reach each of the electronics 310 at substantially the same time, and the signals to and from the electronics 310 are received by the electronics and reach the optical components 304 at substantially the same time. As such, the signal distance between a central electronic device 312 and a plurality of optical components 304 for a given channel are all substantially equal.

Utilizing a plurality of electronics to each control a plurality of optical components allows the apparatus 302 to operate at lower current levels. Operating at lower current levels allows the present apparatus to provide increased data rates. Distributing the optical components 304 at substantially equal signal distances from the electronics 310 maintains coherence between signals to and from the optical components. Further, the signal distances between each of the electronics 310 and the central electronic device 312 are further configured to be substantially equivalent.

Configuring and cooperating a plurality of optical components onto a circuit board allows the optical communication apparatus to be configured to generate optical communication paths that span a relatively large diameter. This large diameter allows for the compensation of alignment fluctuations, interference (e.g., caused by objects that can obstruct portions of the communication beam such as birds) and the like. Further, the use of a plurality of optical components allows for the compensation of turbulence, scintillation, interference or drop outs, one or more optical component failures and other effects that can degrade the level of accurate communication. The optical components can be arranged to provide spatial diversity while still maintaining angular non-diversity. Further, the optical components can be distributed at sufficient distances to achieve uncorrelated communication paths. These advantageous characteristics allow the optical communication apparatus to be very effective in providing free-space optical communication.

Further, utilizing a plurality of transmit optical components (e.g., in a matrix 306) allow the communication apparatus to achieve higher total beam power while complying with lower beam power safety regulations. For example, a plurality of transmitters can be set at levels that will not damage the human eye, (e.g., each beam can operate at up to 2 mW/cm$^2$ (International Electrotechnical Commission (IEC) Class 1M)) while the total beam power of the combined transmitted optical signals is great enough to ensure accurate communication. The plurality of low power beams achieves a total needed power for accurate communication with a low power density.

Figure 10:
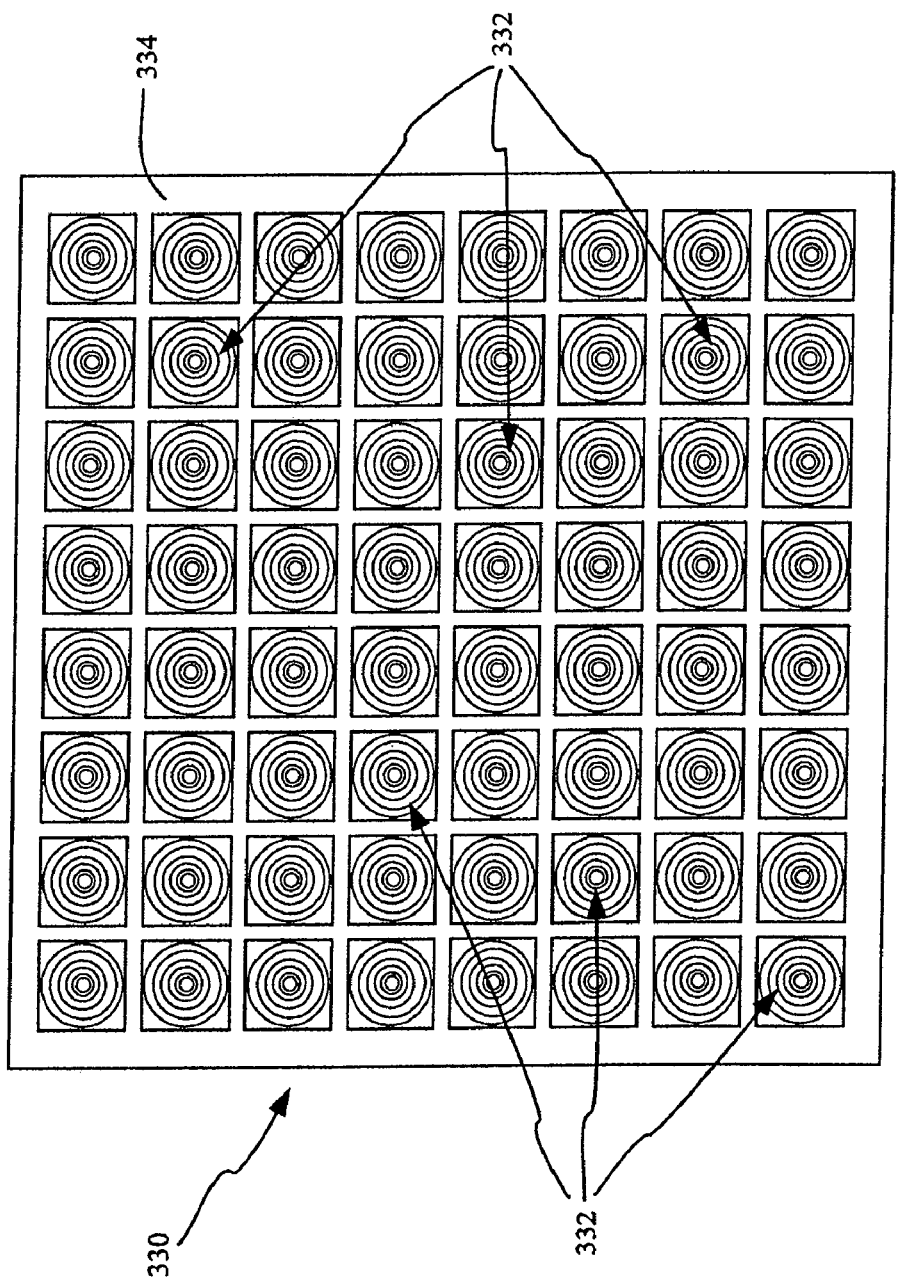
FIG. 10 depicts a simplified block diagram of a planar view of an optics array or matrix 330 according to one embodiment of the present invention.

FIG. 10 depicts a simplified block diagram of a planar view of an optics array or matrix 330 according to one embodiment of the present invention. The optics matrix cart be incorporated in an optical communication apparatus (e.g., 140, 170, 250). The optics matrix 330 includes a plurality of optics elements 332 that are optically coupled and/or aligned with one or more optoelectronic converter components and/or optical components. For example, the optical matrix 330 can include a specific number of optics elements 332 such that each optic element 332 aligns with an optical component 304 of an optical component matrix 302, shown in FIG. 9. The optics elements 332 can be discrete optics secured within the matrix, the matrix can be formed as a single continuous piece with the optics elements 332 formed within the continuous piece, or the matrix can be a combination of discrete optics elements and a plurality of optics elements formed in a continuous piece.

The optics matrix 330 can be constructed of substantially any material or combination of materials to provide the desired optical effect. For example, the optics matrix can include a plastic structure 334 with a plurality of optics elements 332, such as a plurality of plastic lens formed within the plastic structure. Glass can additionally be formed on or bonded with the plastic structure 334 and/or lenses to provide added support and to resist fluctuations or deformations of the lenses and structure due to temperature changes. The optics matrix 330, whether formed of a single continuous piece, discrete lenses and/or combination thereof, can be formed or assembled in an automated manner. The cooperation of the optics elements 332 within the single optics matrix 330 greatly simplifies the alignment at the same time of the all the optics with the respective plurality of optoelectronic converter components.

Figure 11:
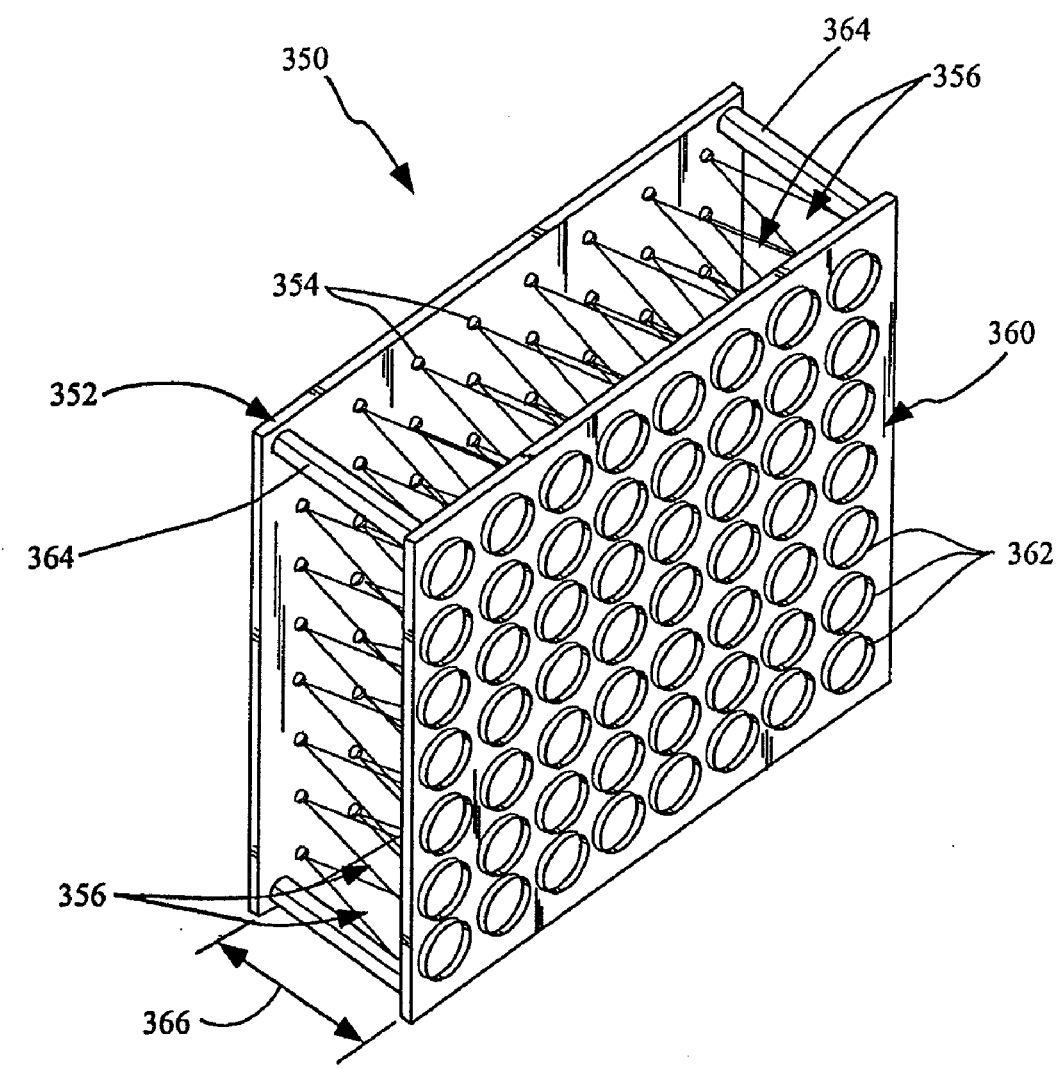
FIG. 11 depicts a simplified block diagram of an elevated view of an optical communication apparatus according to one embodiment of the present invention.

FIG. 11 depicts a simplified block diagram of an elevated view of an optical communication apparatus 350 according to one embodiment of the present invention. The apparatus includes a circuit board 352 with a plurality of optoelectronic converter and/or optical components 354 mounted without packaging directly onto or formed within the circuit board. The optoelectronic converter components are attached to form a matrix. However, substantially any configuration can be utilized. Further, the optoelectronic converter components 354 can be components for generating optical signals 356 and/or for receiving or detecting optical signals 356. For example, the optoelectronic converter components 354 can alternate every other component between a transmitting component and a receiving component.

The apparatus 350 includes a substantially planar optics and/or carrier plate 360, such as an optics matrix (see FIG. 10). The optics matrix 360 includes a plurality of optics elements 362 such as lenses, filters and/or other optics elements. In the embodiment shown in FIG. 11, a single lens 362 is optically coupled and aligned with a single optoelectronic converter component 354 to receive an optical signal 356 from the aligned optoelectronic converter component, and/or to focus an optical signal to impinge on the optoelectronic converter component. The optics matrix 360 is mounted or secured with the circuit board 352 through supports 364 or a housing. The supports are precisely constructed to provide a separation distance 366 between the circuit board 352 and the optics matrix 360. The distance 366 is determined according to the laws of optics, and can be defined by one or more factors including, but not limited to, focal length of the optics elements 362, proximity of optoelectronic converter components, dimensions of the optoelectronic converter components, divergence of the beam from the optics element, and other factors. Typically, the focal lengths of the optics elements are very small relative to optics of other free-space optical communication devices. The small and/or short focal lengths allow for a small separation 366 and thus reduces the overall size of the apparatus 350. The beam divergence transmitted through one or more of the optics elements 362 can be adjusted by adjusting the distance 366 between the optics matrix 360 and the optoelectronic converter components 354. The supports 364 and/or housing provide precise alignment of the optics elements 332. Further, by utilizing the optics array formed or assembled as a single unit lateral adjustments of the optics elements 332 is avoided.

The embodiment depicted in FIG. 11 shows the circuit board 354 and the optics elements 362 as separate elements. However, in some embodiments, the optics are formed or fixed to the circuit board such that the circuit board includes the optoelectronic converter components as well as the optics.

When a plurality of the optoelectronic converter components 354 are employed to generate and transmit optical signals, a multi-beam module is achieved for optical communication, including free-space optical communication. The failure of one or more transmitters can be tolerated when multi-beam transmission is employed. Additionally, the blocking or interference of one or some of the multiple beams can also be tolerated. This results in a high reliability of the communication apparatus. The generated optical signals can be directed and/or conditioned through the optics elements over a free-space link to be received by a receiver. The generated optical signals can be configured such that one or more beams overlap at the receiver. Further, the beams can be defocused to communicate across the link.

In one embodiment, each optical beam generator is set to transmit at a range of wavelengths. Further, the beam generators can be set up so that different generators transmit at different wavelength ranges. This allows the present invention to reduce or avoid interferometry effects and thus improve communication reliability.

Figure 12:
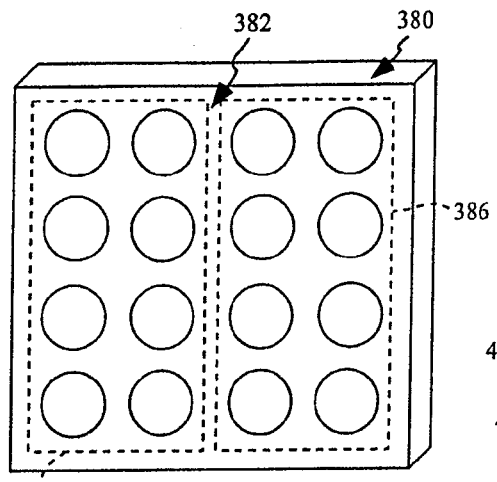
FIGS. 12–15 depict simplified block diagrams of elevated views of some examples of different configurations for the optical components and/or optics according to embodiments of the present invention.

The configuration of the optoelectronic converter components and/or optics can be in substantially any configuration to achieve the desired communication. FIGS. 12–15 depict simplified block diagrams of elevated views of some examples of different configurations for the optoelectronic converter components and/or optics according to embodiments of the present invention. In FIG. 12, an optical communication apparatus 380 is shown with a matrix or array 382 of optics. The matrix is divided into two sub-matrices 384 and 386. Each sub-matrix can be utilized independent of the other matrix. For example, the first matrix 384 can be used to transmit a first optical signal, while the second matrix 386 is used to receive a second optical signal. Alternatively, the first matrix 384 can be used to transmit the first optical signal, while the second matrix 386 is used to transmit a third optical signal. However, the matrices can be utilized together, for example, both matrices can transmit a first signal.

The optical signals can be generated at substantially any power and can be conditioned to achieve a desired signal beam. For example, transmitting at 500 m where each optical signal generated through the array 382 can have a transmit power of +18 dBm with a minimum receive power of −37 dBm, the divergence can be limited to 6 mrad with an optical loss of 4 dB, with optical power budget of 51 dB, a geometric loss of 33 dB and a margin of 18 dB. Other configurations and power levels can be utilized to achieve a desired implementation.

Figure 13:
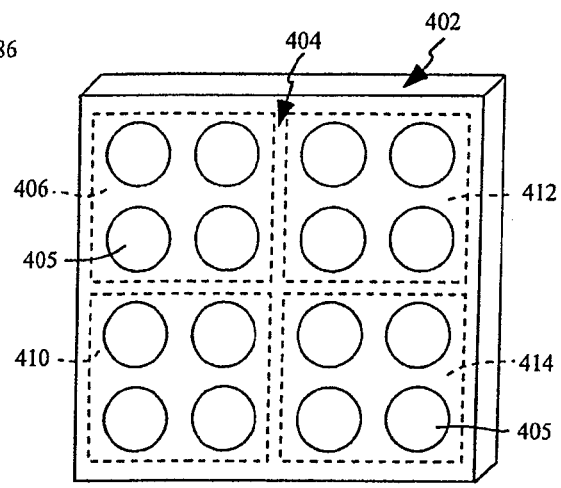

FIG. 13 shows an optical communication apparatus 402 with a matrix 404 of optics elements 405 and/or optoelectronic converter components. The matrix includes four sub-matrices 406, 410, 412, 414. Each sub-matrix can be utilized independent of the other matrices. For example, the first matrix 406 can be used to transmit a first optical signal, the second matrix 410 can be used to transmit a second optical signal, the third matrix 412 can be used to transmit a third optical signal, and the fourth matrix 414 can be used to transmit a fourth optical signal. As another example, the first matrix 406 can be used to transmit the first optical signal, the second matrix 410 can be used to transmit the second optical signal, the third matrix 412 can be used receive a third optical signal, and the fourth matrix 414 can be used to receive a fourth optical signal. Other combinations and can be used without departing from the inventive aspects of the present invention.

For example, the apparatus shown in FIG. 13 can be configured to communicate at 155 Mbps, transmitting over a distance of 300 m where each optical signal generated through the array 402 can have a transmit power of +15 dBm with a minimum receive power of −37 dBm, the divergence can be limited to 6 mrad with an optical loss of 6 dB, with an optical power budget of 46 dB, a geometric loss of 31 dB and a margin of 15 dB.

Figure 14:
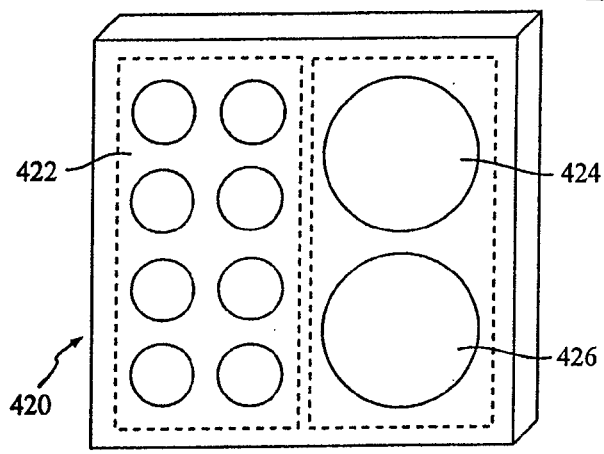

FIG. 14 shows an optical communication apparatus 420 with a matrix 422 of optics elements as well as a first large optic element 424 and a second large optic element 426. In one embodiment, each optic element of the matrix 422 can be optically coupled and aligned with a single optical component, and each of the first and second optics elements are optically coupled and aligned with a plurality of optoelectronic converter components and/or optical components. Alternatively, the first and/or second large optics elements can optically couple and align with a single optical component. In one embodiment, the optics elements can be associated with separate and different signal channels that carry logically separate information encoded, for example, on different wavelengths or with different polarizations. Further, the matrix 422 can be divided into any number of sub-matrices as described above. The communication through the matrix and the two large optics can be configured in substantially any configuration. For example, the first large optic 424 can transmit a first optical signal, the second large optic 426 can transmit a second optical signal, and the matrix 422 can receive a third optical signal. Alternatively, the first large optic can receive a first optical signal, the second large optic can transmit a second optical signal, and the matrix 422 can transmit a third optical signal.

Figure 15:
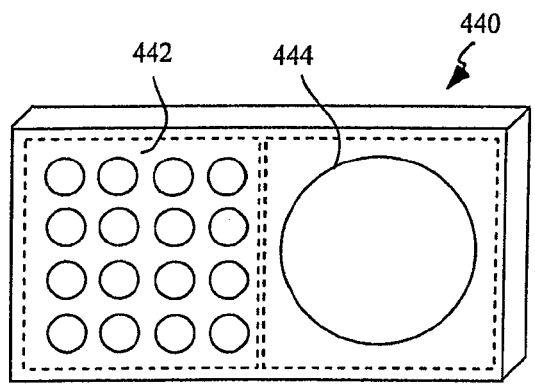

FIG. 15 shows an optical communication apparatus 440 with a matrix 442 of optics elements as well as a large optic element 444. As described above, the matrix 422 can be divided into any number of sub-matrices. The communication through the matrix and the large optic can be configured in substantially any configuration. For example, the large optic 444 can transmit a first optical signal and the matrix 442 can receive a second optical signal. Alternatively, the large optic 444 can receive a first optical signal and the matrix 442 can transmit a second optical signal. Other combinations can be used without departing from the inventive aspects of the present invention.

Figure 16:
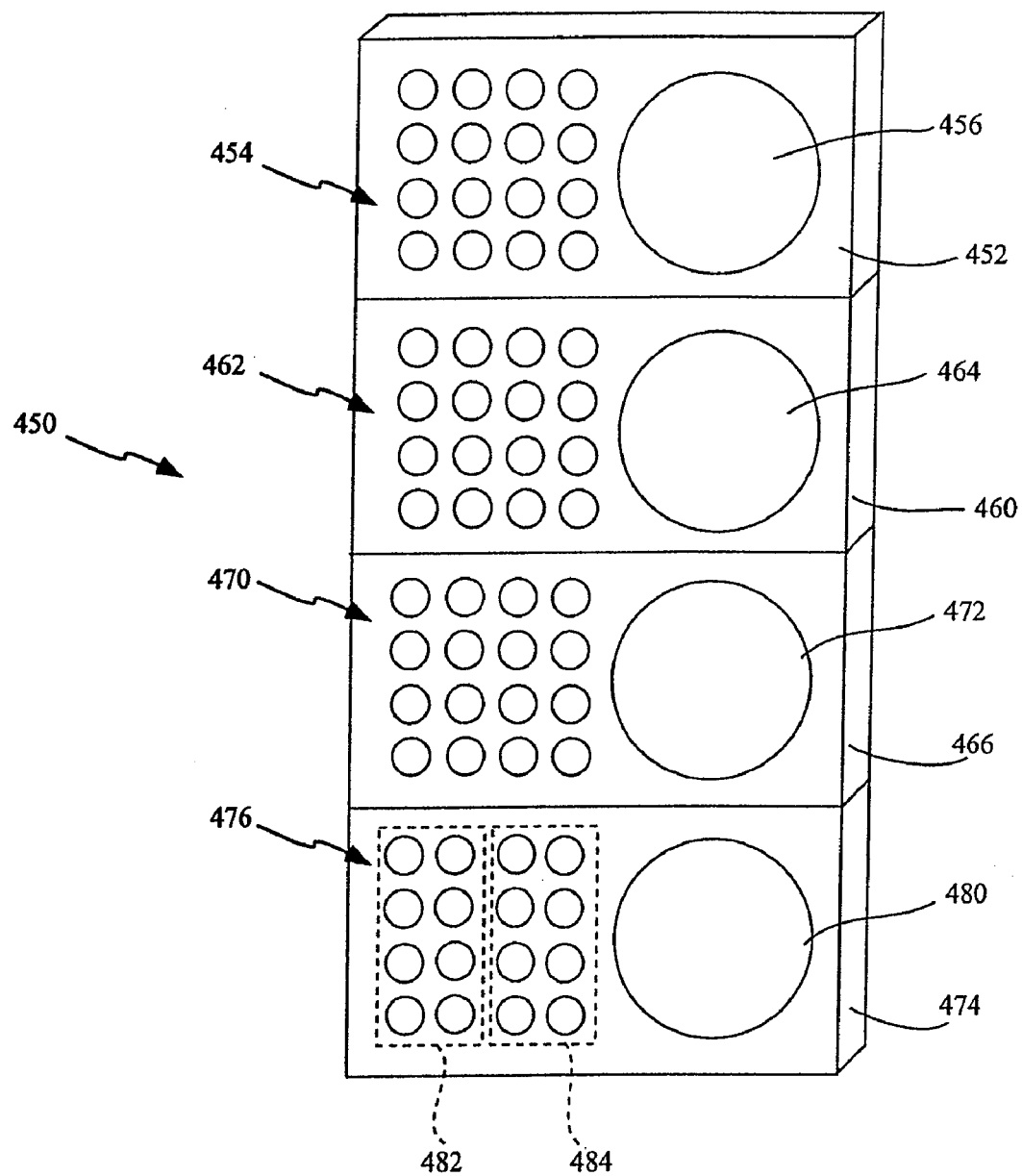
FIG. 16 depicts a simplified block diagram of an elevated view of an optical communication apparatus according to one embodiment of the present invention.

FIG. 16 depicts a simplified block diagram of an elevated view of an optical communication apparatus 450 according to one embodiment of the present invention. The apparatus 450 includes a plurality of sub-apparatuses 452, 460, 466 and 474 that are stacked and/or combined. The sub-apparatuses are similar to the apparatus 440 shown in FIG. 15. However, any sub-apparatus or combination of sub-apparatuses can be utilized in the assembly of the communication apparatus 450. In the embodiment shown in FIG. 16, each sub-apparatus includes a matrix of optics elements 454, 462, 470 and 476, as well as a large optic element 456, 464, 472 and 480. As described above, the matrix of optics and the large optic in each sub-apparatus can be used to transmit and/or receive optical signals. Further, each matrix can be divided into sub-matrices as described above.

As an example, a first signal can be transmitted by the matrices 454, 462, 470, and 476 while a second signal can be received by the large optic elements 456, 464, 472 and 480.

Again, the optical signals can be generated at substantially any power and can be conditioned to achieve a desired signal beam. For example, the apparatus 450 can transmit at 2000 m where each optical signal generated can have a transmit power of +27 dBm with a minimum receive power of −37 dBm, the divergence can be limited to 6 mrad with an optical loss of 4 dB, with optical power budget of 60 dB, a geometric loss of 34 dB and a margin of 26 dB. With this configuration, each sub-apparatuses 452, 460, 466 and 474 (if not each optical component and optics element) can generate communication signals providing, for example, 155 Mbps data rates and greater.

Figure 17:
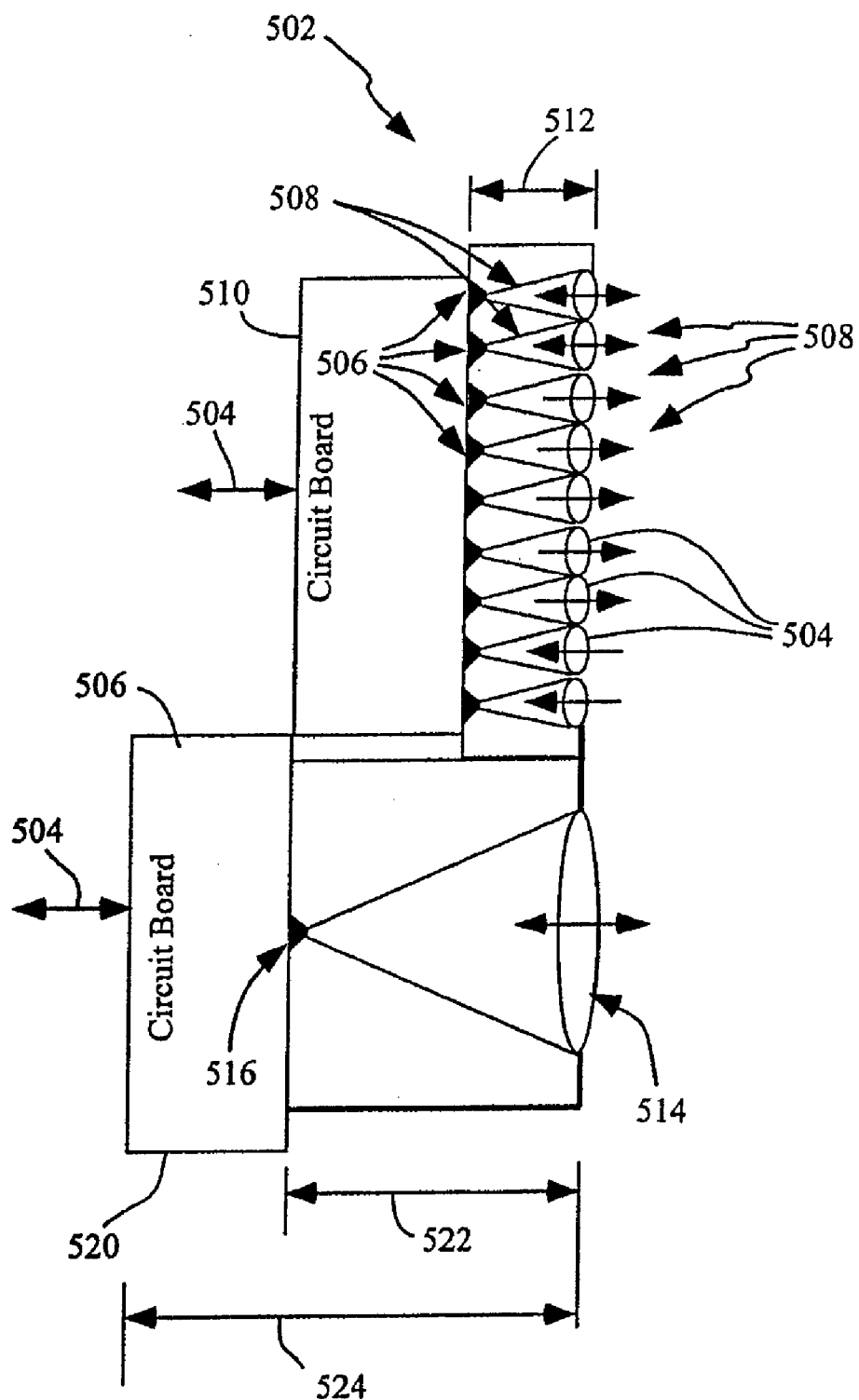
FIG. 17 depicts a simplified block diagram of a cross-sectional view of an optical communication apparatus according to one embodiment of the present invention.

FIG. 17 depicts a simplified block diagram of a cross-sectional view of an optical communication apparatus 502 according to one embodiment of the present invention. The apparatus 502 includes a plurality of small optics elements 504 that are optically coupled and aligned with at least one optoelectronic converter component and/or optical component 506, such as a laser, detector or the like. Each optoelectronic converter component 506 is directly mounted on a first circuit board 510 to receive and/or transmit communication data through optical signals 508. The small optics elements 504 are configured to have short focal lengths 512, relative to optics incorporated in previous optical communication devices, and particularly previous free-space optical communication devices.

The apparatus 502 additionally includes a large optics element 514. The large optic element is optically coupled with one or more optoelectronic converter components 516. The one or more optoelectronic converter components 516 are directly mounted onto a second circuit board 520. The second circuit board 520 can be an independent circuit board from the first circuit board 510, or the second circuit board 520 can be a part of a single circuit board containing both the first and second circuit boards 510, 520, respectively. The large optic element 514 has a focal length 522 that is longer and/or larger than the short focal length 512 of the small optics 504. The longer focal length 522 is typically similar to the focal lengths of optics elements incorporated in previous free-space optical communication devices. As such, the second circuit board 520 is offset from the first circuit board 510, or the first and second circuit boards are assembled on a single plane and the large optic 514 is positioned out further from the circuit boards 510 and 520 than the small optics 504. With the large optic element having the longer focal length 522, the depth 524 of the apparatus 502 is larger than if just small optics elements 504 had been utilized.

The present invention can be implemented to provide free-space optical communication. Two transceivers assembled, such as those described above or other configurations where optoelectronic converter components are mounted directly onto a circuit board, can be aligned with each other on opposite sides of a free-space link. As such, optical communication can be provided between the transceivers. The transceivers can employ a plurality of small optics elements, one or more large optics and/or a combination of small and large optics elements.

Figure 18:
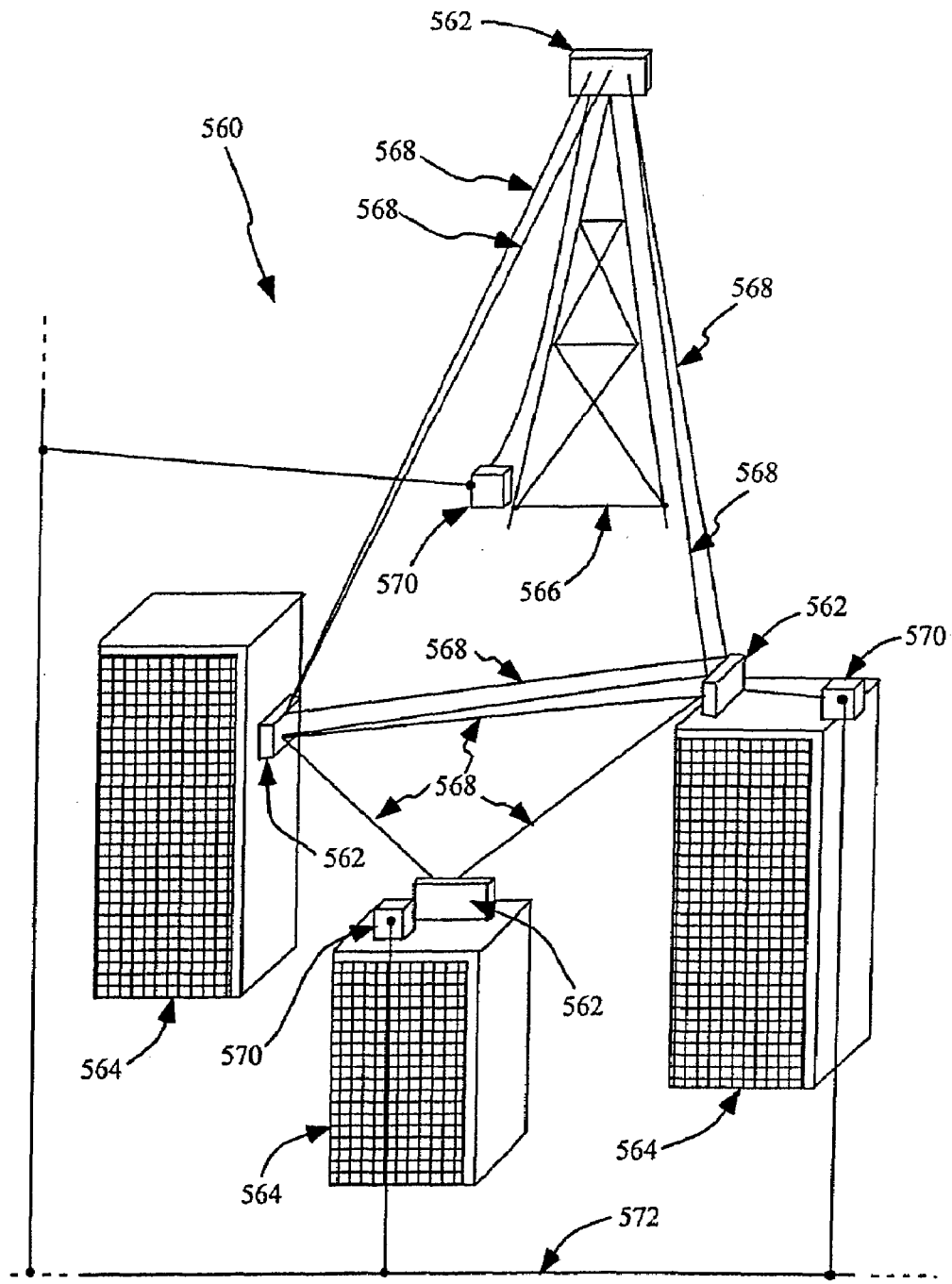
FIG. 18 depicts a simplified block diagram of a free-space optical communication network for providing communication according to one embodiment of the present invention.

FIG. 18 depicts a simplified block diagram of a free-space optical communication network 560 for providing communication according to one embodiment of the present invention. A plurality of optical transceivers 562 are distributed around an area, for example distributed through a metropolitan area. The transceivers can be mounted on or within buildings 564, towers 566 and other structures. The transceivers are configured according to one embodiment to include a plurality of optoelectronic converter devices aligned with a plurality of optics elements to generate a plurality of free-space optical signals 568. Because the present invention provides free-space optical communication apparatuses that can have decreased weights and size relative to previous free-space optical communication devices the present apparatuses can be mounted in positions that were previously unavailable. For example, communication apparatuses can be mounted on the sides of building, on structures than cannot support excess weights and in other locations previously unavailable. Further, because the present apparatuses can have a reduced size and weight, the apparatuses can be mounted within buildings without adversely affecting views and without affecting the aesthetics of the building interior.

Still referring to FIG. 18, the transceivers 562 are optically aligned to transmit and/or receive the optical signals 568 to provide communication of data and/or information across the network. In one embodiment, the transceivers 562 can be coupled with routers 570 or other signal distribution devices within or on the builds, or coupled with (or part of) a communication network 572. The routers 570 are show on the buildings; however, typically, the routers are located within the building or other structures. The routers 570 can supply optical or electrical data signals to the transceiver to be communicated optically over the free-space, or to receive optical or electrical signals converted by the transceiver from the received free-space optical signals. The routers 570 can route signals within the build and/or be coupled with the communication network 572, such as a fiber optic network, a PSTN or other network.

The present invention provides free-space optical signal transmitters, receivers and/or transceivers with reduced dimensions over previous transmitters, receivers and transceivers. Directly incorporating the plurality of optical components onto the circuit board allows for the elimination of the packaging and fiber optic coupling or connections of previous devices. Further, smaller optics elements are employed that are secured relative to the circuit board. The optics elements are designed to have small focal lengths, reducing the distance at which the optics are fixed relative to the circuit board and optical components. This again results in the ability to further reduce the size of the transmitters, receivers and/or transceivers of the present invention.

The incorporation of optical components without package and fiber optic connections reduces the weight of the transmitter, receiver and/or transceiver of the present invention. Further, the use of the small optics further reduces the weight of the present invention. Still further, the reduced dimensions of the apparatus results in less material needed for the structure and to house the transmitter, receiver, and/or transceiver of the present invention, resulting in further reduced weight. Thus, the present invention provides a lighter apparatus for optical communication.

The reduced size and weight allow the present apparatus to be mounted easier, at reduced costs, and in locations that previously were not accessible by previous systems. Still further, the reduced size translates to reduced area of a building or structure needed to mount the present apparatus as well as providing aesthetic benefits to the end-user.

Utilizing optical components that do not have packaging or fiber optic coupling, allows the present invention to be constructed at reduced costs over previous devices. Further, the present invention utilizes a plurality of low power optical components to achieve the desired receive power while maintaining low power density levels. The cost of low power transmitters is significantly less than higher power transmitters further reducing the cost of the present invention over previous systems delivering the same optical power at the receiver.

Further, the mounting of the optical components onto the circuit board can be achieved through mechanical means. As such, the present invention can be produced in volume at significantly reduced costs. Thus, the present invention can be constructed at costs less than previous systems.

The present invention employs a plurality of low power optical signals, distributed over an area resulting in low power density that meets eye safety regulations. Further, the use of the plurality of low power optical signals sum to provide the needed optical power at the receiver. Still further, utilizing a plurality of optical components (e.g., generating a plurality of free-space optical signals) allows the apparatus to tolerate one or more transmitter and/or receiver optical component failures, turbulence, and interference. The present invention can be constructed to have dimensions which further provide for incoherency to improve communication.

By utilizing a plurality of optical transmitters, the present invention is capable of utilizing reduced currents to drive the transmitters. Reduced currents allow for higher data rates because fewer electrons are being forced through the conducts. Thus the present invention achieves increased communication data rates.

The apparatus utilizes optical components mounted or formed directly on the circuit board eliminating the three-coordinate (X, Y and Z) adjustments of each optical component. Further, in some embodiments, the present invention employs the array of optics elements secured together which additionally eliminates the need to three-dimensionally align each optic.

While the invention herein disclosed has been described by means of specific embodiments and applications thereof, numerous modifications and variations could be made thereto by those skilled in the art without departing from the scope of the invention set forth in the claims.

What is claimed is:

1. An apparatus for optical communication, comprising:
    a first board;
    a plurality of optoelectronic converter components mounted on the first board;
    at least one optics element optically aligned with at least one of the optoelectronic converter components and configured to pass light directly between free-space and the at least one of the optoelectronic converter components; and
    electronics coupled to the plurality of optoelectronic converter components for distributing the same signal to each of the optoelectronic converter components such that the plurality of the optoelectronic converter components transmit the same optical signal into free-space;
    wherein the plurality of optoelectronic converter components generate a plurality of optical signals that are positioned such that their divergence causes them to overlap and combine to sum to provide optical power at a receiver.

2. The apparatus as claimed in claim 1, wherein the electronics are mounted on the first board.

3. The apparatus as claimed in claim 1, further comprising:
    a second board having the electronics mounted thereon, wherein the second board is positioned to a side of the first board opposite the at least one optics element.

4. The apparatus as claimed in claim 1, further comprising:
    a plurality of optics elements wherein each one of the plurality of optical elements is optically aligned with one of the plurality of optoelectronic converter components.

5. The apparatus as claimed in claim 4, wherein the plurality of optics elements provide an array of optics elements secured together and fixed in position relative to the plurality of optoelectronic converter components.

6. The apparatus as claimed in claim 1, further comprising:
    a plurality of electronics, wherein each of the plurality of electronics couples with at least one of the plurality of optoelectronic converter components.

7. The apparatus as claimed in claim 1, wherein at least one of the plurality of optoelectronic converter components comprises a laser for transmitting optical signals into free-space.

8. The apparatus as claimed in claim 1, further comprising an additional plurality of optoelectronic converter components comprising one or more photodiodes for detecting optical signals from free-space.

9. The apparatus as claimed in claim 1, further comprising:
    a plurality of electronics;
    each of the plurality of optoelectronic converter components is coupled with at least one of the plurality of electronics, wherein the plurality of optoelectronic converter components are distributed across at least a portion of the first board such that at least two of the plurality of optoelectronic converter components are at equal signal distances from one of the plurality of electronics.

10. A method of optically communicating comprising the steps of:
    providing the same electric signals to a plurality of lasers that are mounted on a first board;
    generating a plurality of optical signals with the plurality of lasers in response to the same electric signals; and
    directing the plurality of optical signals into free-space with at least one optics element optically aligned with at least one of the plurality of lasers and configured to pass the optical signals directly from the at least one laser into free-space with the plurality of optical signals being position such that their divergence causes them to overlap and combine to sum to provide optical power at a receiver.

11. The method as claimed in claim 10, wherein the step of providing comprises the step of:
    providing electric signals to the plurality of lasers with electrical components that are mounted on the first board and electrically coupled to the plurality of lasers.

12. The method as claimed in claim 10, wherein the step of providing comprises the step of:
    providing electric signals to the plurality of lasers with electrical components that are mounted on a second board positioned to a side of the first board opposite the at least one optics element and electrically coupled to the plurality of lasers.

13. The method as debited in claim 10, wherein the step of directing including directing the plurality of optical signals into free-space with a plurality of optics element optically aligned with at least one of the plurality of lasers, wherein the plurality of optics elements are configured to pass the plurality of optical signals directly from the plurality of lasers into free-space.

14. The method as claimed in claim 10, wherein the step of providing includes providing electric signals to the plurality of lasers further comprising the step of:

communicating the electrical signals over a plurality of equal signal distances on the first board.

15. The method as claimed in claim 10, further comprising the steps of:

receiving a receive optical signal from free-space with a receive optics element;

directing the receive optical signal directly onto a detector that is mounted on the first board and tat is optically aligned with the receive optics element so that the received optical signal can be passed directly from free-space to the detector; and detecting the receive optical signal with the detector to generate a corresponding receive electrical signal.

16. A method of optically communicating, comprising the steps of:

receiving from a single remote transmitting device over a free-space link subject to atmospheric conditions an optical signal comprising a sum of a plurality of optical beams each communicating the same data from free-space with one or more optics elements wherein the sum of plurality of optical beams results from the plurality of optical beams being positioned such that their divergence causes them to overlap and combine to sum;

directing the optical signal onto one or more detectors that are mounted on a first board and that are optically aligned with the one or more optics elements so that the optical signal is passed directly from free-space to the one or more detectors; and detecting at least one of the plurality of optical beams of the optical signal with the one or more detectors to generate corresponding electrical signals based on the detected optical signal.

17. The method as claimed in claim 16, further comprising the step of.

receiving the electric signals from the one or more detectors with electrical components that are mounted on the first board and electrically coupled to the one or more detectors.

18. The method as claimed in claim 16, wherein the step of providing comprises the step of:

receiving the electric signals from the one or more detectors with electrical components that are mounted on a second board positioned to a side of the first board opposite the optics element and electrically coupled to the plurality of detectors.

19. The method as claimed in claim 16, wherein:

the step of directing including each of the one or more optics elements directing the optical signal onto only one of the one or more detectors where each of the one or more detectors are optically aligned with only one of the one or more optics elements so that the optical signal can be passed directly from free-space to the one or more detectors; and detecting the optical signal with the one or more detectors to generate the corresponding electrical signals.

* * * * *